United States Patent [19]
Perry-Bores et al.

[11] Patent Number: 5,803,529
[45] Date of Patent: Sep. 8, 1998

[54] MECHANISM FOR SELECTIVELY INSTALLING AND REMOVING A CLOTH TOP FROM A JEEP-TYPE VEHICLE AND INCLUDING A SEPARATELY REMOVABLE FORWARD TOP PORTION

[76] Inventors: Carol A. Perry-Bores; Leonard F. Bores, both of 30606 Munger, Livonia, Mich. 48154

[21] Appl. No.: 769,222

[22] Filed: Dec. 17, 1996

[51] Int. Cl.⁶ .................................................. B60J 7/00
[52] U.S. Cl. .................................................. 296/107
[58] Field of Search ........................... 296/107, 108, 296/109, 114, 115, 120.1, 136

[56] References Cited

U.S. PATENT DOCUMENTS

| | | |
|---|---|---|
| 3,195,549 | 7/1965 | Stevens .................. 296/107 |
| 4,746,163 | 5/1988 | Muscat . |
| 4,850,634 | 7/1989 | Taubitz . |
| 5,031,949 | 7/1991 | Sorimachi et al. . |
| 5,078,447 | 1/1992 | Klein et al. . |
| 5,090,764 | 2/1992 | Kogawa et al. . |
| 5,209,544 | 5/1993 | Benedetto et al. . |
| 5,299,850 | 4/1994 | Kaneko et al. .................. 296/107 |

*Primary Examiner*—Stephen Avila
*Attorney, Agent, or Firm*—Gifford, Krass, Groh, Sprinkle, Patmore, Anderson & Citkowski, P.C.

[57] ABSTRACT

A removable vehicle top assembly for use with a Jeep-type vehicle for attaching a combination hard top and flexible soft top cover. A first hard top cover is fastened over a forward passenger area of the vehicle. A rearward storage area of the vehicle is defined in part by a pair of roll bars which extend to a rear of the vehicle. A first U-shaped and extensible assembly is pivotally secured to the sides of the vehicle and envelops the roll bars. A second generally U-shaped member is pivotally mounted to a rearward end of the roll bars and includes a spaced middle elongated portion. The flexible cover is drapped over the second U-shaped member and is attached to the U-shaped extensible assembly and to portions of the sides and rear of the vehicle. The second U-shaped member includes a pivot mechanism which rotates the second member between a material installing, a material tautening and a rearward non-use position.

17 Claims, 5 Drawing Sheets

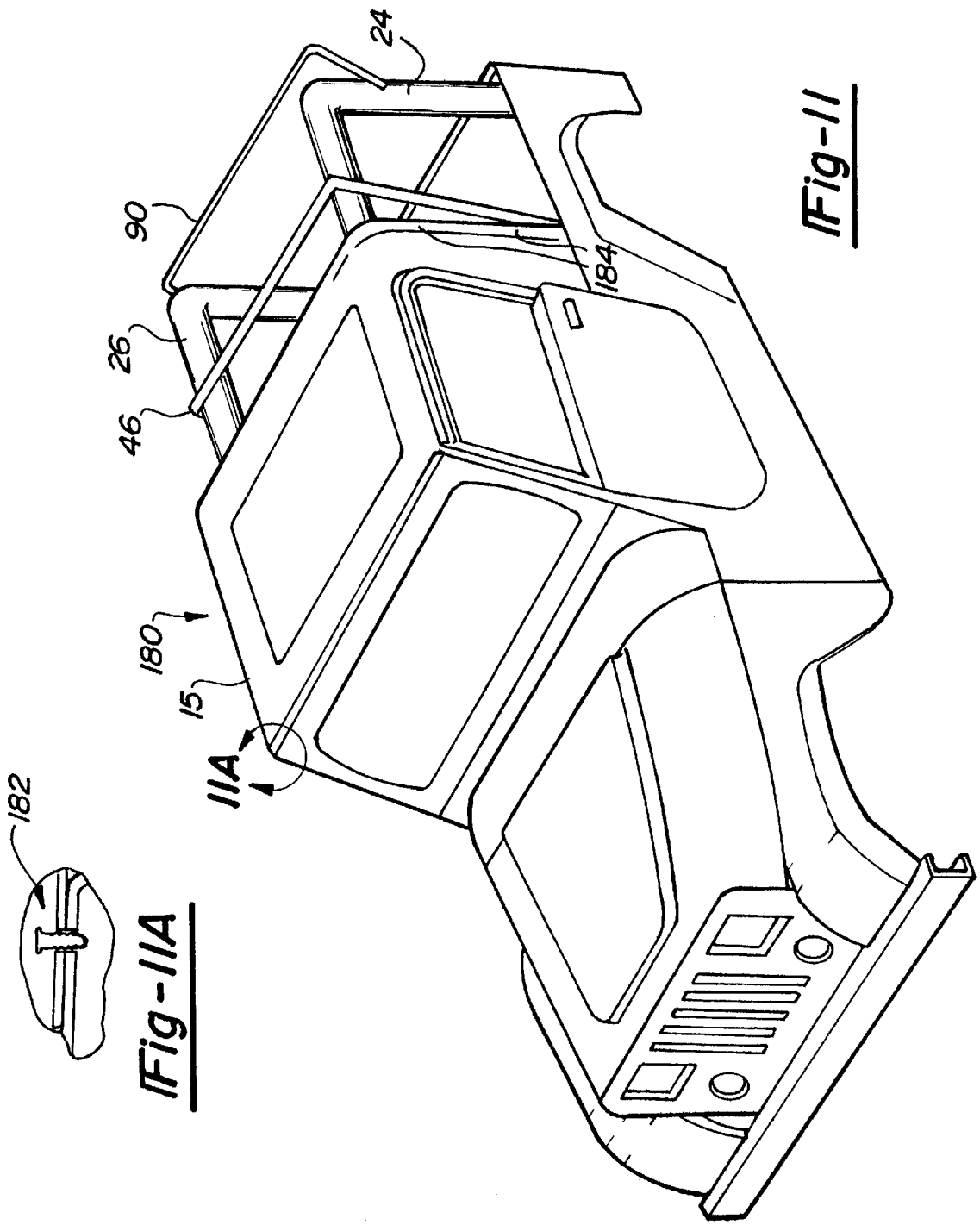

MECHANISM FOR SELECTIVELY INSTALLING AND REMOVING A CLOTH TOP FROM A JEEP-TYPE VEHICLE AND INCLUDING A SEPARATELY REMOVABLE FORWARD TOP PORTION

BACKGROUND OF THE INVENTION

1. Field of the Invention

The present invention relates generally to removable and convertible vehicle top assemblies and, more particularly, to a combination hard and soft top for a Jeep-type vehicle including a mechanism for selectively installing and removing a cloth top rear portion to and from the vehicle and for installing and removing a separately removable forward hard-top portion in addition to the removable rear portion.

2. Description of the Prior Art

The use of convertible and removable vehicle tops is well documented in the automotive industry. Convertible tops are advantageously used to raise and lower a vehicle's covering member depending upon the given weather conditions and the desirability of having the top down. Removable vehicle tops are also primarily employed based upon the existing weather conditions but may also be interchangeable with other and additional modified tops in the event it is desired to mount another top to the vehicle which may have a different construction.

U.S. Pat. No. 4,746,163, issued to Muscat, teaches a combination removable panel-convertible top system which includes a rear convertible frame section and a separately attachable section which extends between the rear section and an edge of the windshield to substantially overlay the forward seating area of the vehicle. While providing a convenient and useful convertible top assembly for a passenger-type vehicle, the device of Muscat is not readily adaptable for use with other vehicle types, specifically Jeep design vehicles.

U.S. Pat. No. 4,850,634, issued to Taubitz, teaches a folding top for cross-country vehicles which includes a number of interconnected tubular members which are selectively folded and unfolded to create a skeletal structure over which is attached a covering material. The disadvantages of the Taubitz structure includes its relative complexity of design which increases the likelihood of a material failure over extended use. A further disadvantage of the folding structure of Taubitz is the inability to use the device with a Jeep-type vehicle which customarily utilizes roll bar protectors extending throughout the passenger and storage compartments of the vehicle, the existence of roll bars preventing the necessary range of motion indicated in the Taubitz disclosure.

The standard Jeep vehicle includes forwardly directed passenger and rearwardly directed storage compartments. A pair of roll bars extend throughout the passenger and storage areas and provide protection the vehicle's occupants in the event of a rollover. Currently, two different Jeep top covers are available for use and include a soft top cover for warm weather driving conditions and a heavier hard top cover for winter driving. The disadvantages of owning two tops for use with the vehicle include the increased cost of owning more than one top, the need for storage of the unused top and the effort which must be expended in disengaging one of the tops and attaching the other.

SUMMARY OF THE PRESENT INVENTION

The present invention is a removable vehicle top assembly for use with a Jeep-type vehicle. The vehicle includes a forwardly situated passenger area and a rearwardly situated storage area which is defined by sides and a rear of the vehicle. A pair of spaced apart roll bars extend from a forward to a rearward direction along the seating and storage areas of the vehicle and provide roll-over protection to the occupants in the event the vehicle overturns.

A first covering portion is preferably constructed of a one piece semi-rigid body, integrated with the vehicle's roll bar, and is secured to the vehicle by a plurality of fasteners so as to overlay the passenger seating area. The first covering portion is releasably securable over the passenger seating area and an overhead area behind the seating area is defined by an open space between the roll bars.

A first generally U-shaped and extensible assembly is secured to the upper sides of the vehicle proximate to a forward end of the storage area and rearwardly of the passenger seating area and removable front portion such that the U-shaped assembly envelopes the rearwardly extending roll bars. The assembly is extendable in a pivoting and translating direction across a top surface of the roll bars and towards the rear of the vehicle. Guide brackets are secured to the vehicle along rear adjacent edges of the front covering portion and, in combination, form a shape similar to the extensible assembly to provide abutting support to the assembly in an installed position.

The U-shaped assembly includes interconnected and telescoping tubular members according to one embodiment which are attached by fixed pivots to the bracket on the sides of the vehicle. According to another embodiment, first and second elongated attachable members are mounted lengthwise to the sides of the vehicles and are provided with horizontally extending slots formed therein. An integral U-shaped bar is secured within the slots on each side by a pin assembly and is both rotatable and translatable along the slots so the top central member of the U-shaped bar is slidingly movable across the top of the roll bars towards the rear of the vehicle.

A second generally U-shaped member includes first and second opposing and angled ends and a middle elongated portion. The ends are attached to rearward locations of the spaced apart roll bars so that the middle portion extends rearwardly between and preferably above the roll bars at a spaced distance. A pivot mechanism is built into each attachment to permit the second U-shaped member to be rotated between a material installing, material tautening and retracted non use position.

A flexible covering material is constructed of a top, first and second sides and a rear and is placed over the rearwardly extending roll bars of the vehicle so that a front edge of the top and sides secures around the first U-shaped and extensible assembly. Bottom edges along the sides of the covering material attach to the associated sides of the vehicle and the rear of the flexible cover drapes over the second substantially U-shaped member so that an associated bottom edge of the rear attaches directly to a tail gate portion of the vehicle. The first U-shaped extensible pivoting assembly and second U-shaped pivoting member are manipulated in combination to selectively install, raise, and to also lower and remove the covering material to and from the vehicle in a quick and convenient fashion.

BRIEF DESCRIPTION OF THE DRAWINGS

Reference will now be had to the attached drawings, when read in combination with the following specification, wherein like reference numerals refer to like parts throughout the several views, and in which:

FIG. 11 is a perspective view of the Jeep-type vehicle according to the present invention and illustrating the first covering portion overlaying the passenger seating area.

DESCRIPTION OF THE PREFERRED EMBODIMENTS

Figure 1:
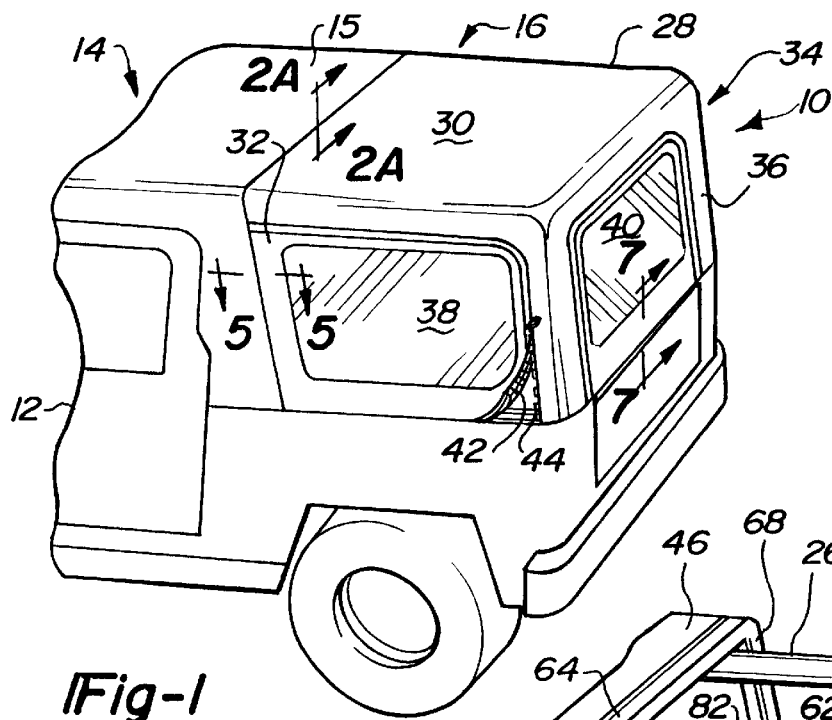
FIG. 1 is a perspective view of a Jeep-type vehicle illustrating the flexible cover secured over the removable vehicle top assembly according to the present invention.

Referring to FIG. 1, a removable vehicle top assembly 10 is illustrated in use with a Jeep-type vehicle 12 according to the present invention. The Jeep 12 is according to the standard variety currently produced by Chrysler Automotive Corporation and has a body which includes a forwardly situated seating area 14 and a rearwardly situated storage area 16. A first covering portion, illustrated at 15, is secured to the vehicle in a fashion so as to overlay the area 14 positioned substantially above the passenger seating. A more thorough description of the features of the first covering portion will be had upon reference to FIG. 11.

Figure 2:
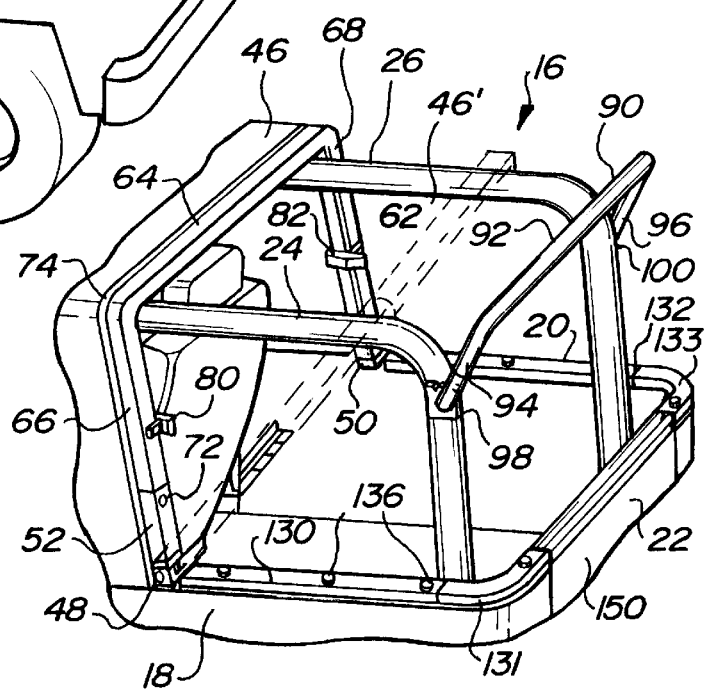
FIG. 2 is a view in section of the exposed storage area of the vehicle and illustrating the U-shaped extensible assembly and pivoting U-shaped member according to the present invention.

Referring further to FIG. 2, the rearwardly situated area 16 of the Jeep 12 is further defined by a first side 18, a second side 20 and a rear 22. A first roll bar 24 and a second roll bar 26 extend along the length of the passenger and storage areas of the Jeep vehicle and are spaced apart towards opposite sides of the Jeep. Although not shown in their entirety, the roll bars 24 and 26 extend from a position forwardly of the passenger seating area in substantially level fashion the length of the vehicle and curve downwardly towards the rear 22 of the vehicle in a substantially L-shape. The roll bars 24 and 26 provide the safety feature of protecting the occupants in the event the vehicle overturns and are a standard feature on most Jeep vehicles.

The removable vehicle top assembly according to the present invention as will now be described in detail is an improvement over current Jeep-type covers in that it provides a split-top assembly which may be used as a year round accessory with the vehicle and which further takes advantage of the arrangement of the roll bars to provide an easily attachable and removable flexible covering member.

Referring again to FIG. 1, the flexible covering member is shown at 28 and includes a top 30, a first side 32, a second side 34 and a rear side 36. The covering member 28 is preferably constructed of a flexible cloth waterproof material and may include one or more windows located in the sides and/or rear as is represented by a side window 38 and a rear window 40. The windows 38 and 40 are constructed of cloth and transparent portions and are surrounded by zippered edges, as illustrated by zipper 42 along the edge of window 38 which interengages with an opposing zippered edge 44 extending along a peripheral edge of the side 32. The side and rear windows may further be removed as desired without compromising the overall attachment of the covering member 28 with the vehicle 12.

Referring again to FIG. 2, a first generally U-shaped and extensible assembly 46 is provided and is pivotally connected to the first side 18 of the vehicle 12 at 48 and to the second side 20 at 50 at positions proximate to a forward end of the storage area 16. The pivotal connections 48 and 50 are each provided by a bracket which is attached to an upper surface of the associated vehicle side.

Figure 3:
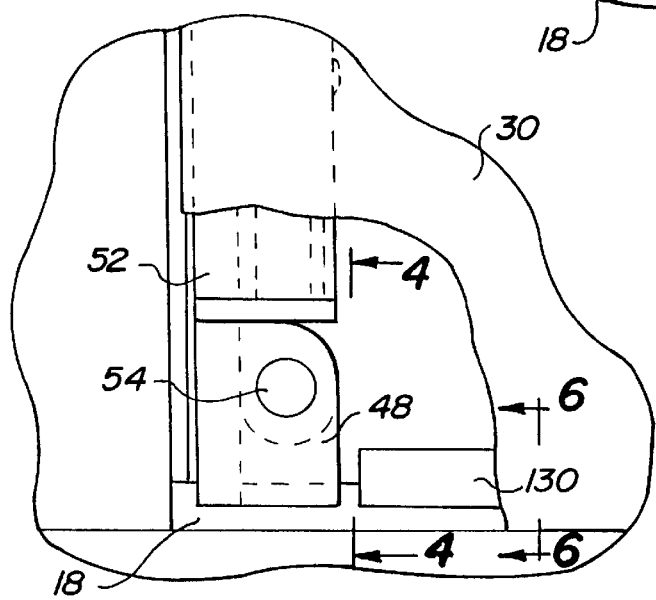
FIG. 3 is sectional view in partial cutaway of a pivoting connection between the U-shaped extensible assembly and the vehicle according to a first preferred embodiment of the present invention.

As is further shown with reference to FIG. 3, the bracket 48 extends generally upwardly from the associated side of the vehicle and has a rounded upper surface so that a first intermediate member 52 of a determinate length is connected to the bracket 48 by a pivot pin 54 inserted therethrough and is capable of rotating relative to the bracket. As is further illustrated in the side cutaway view of FIG. 4, the first intermediate member 52 terminates at its bottom in a reduced molded end portion 56 through which is formed an aperture for receiving the laterally inserted pivot pin 54. The side profile of the bracket 48 includes a flattened base portion terminating in an inner and downwardly extending lip 58 which curls around an inner edge of the truck side 18 and which facilitates locating of the bracket 48 upon the truck for receiving a securing fastener 60.

Figure 4:
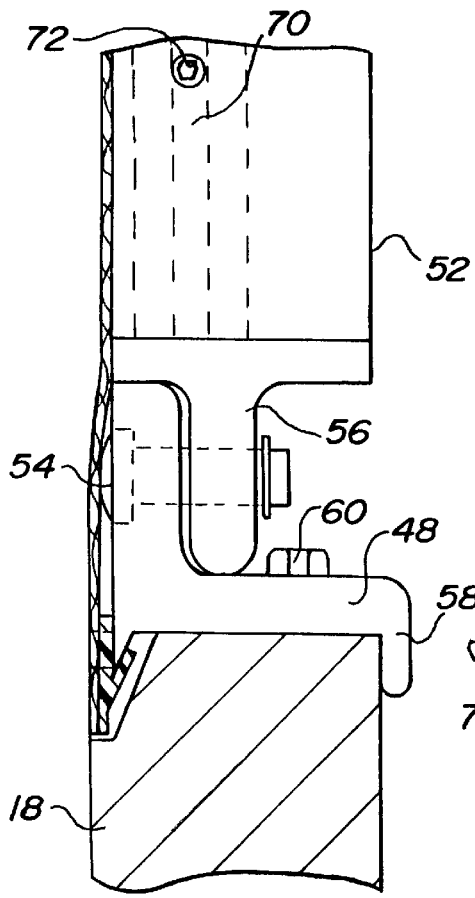
FIG. 4 is a cutaway view taken along line 4—4 of FIG. 3 illustrating a side view of the pivoting connection and further showing the manner of attachment of the flexible cover to the sides of the vehicle.

Referring again to FIG. 2, a second intermediate member 62 is likewise attached to the bracket 50 by a pin (not shown) in the same fashion as illustrated in FIGS. 3 and 4. According to the first preferred embodiment, a U-shaped bar is provided and includes a central member 64 and first and second downwardly extending members 66 and 68. The U-shaped bar is provided as an integral one piece member and is connected to the first and second intermediate members 52 and 62 at opposite ends thereof so that the U-shaped bar is extensible relative to the pivotally and mounted fixed intermediate members and extends around and envelops the parallel extending roll bars 24 and 26.

Specifically, referring once again to FIG. 4, a slotted portion 70 is formed axially along the first intermediate member 52. While the entire length of the slotted portion 70 is not shown in FIG. 4, a sliding pin member 72 is illustrated which is mounted to the slotted portion 70. The sliding pin 72 is also evident from FIG. 1 and interconnects the intermediate member 62 with the downwardly extending member 66 of the U-shaped bar.

Figure 5A:
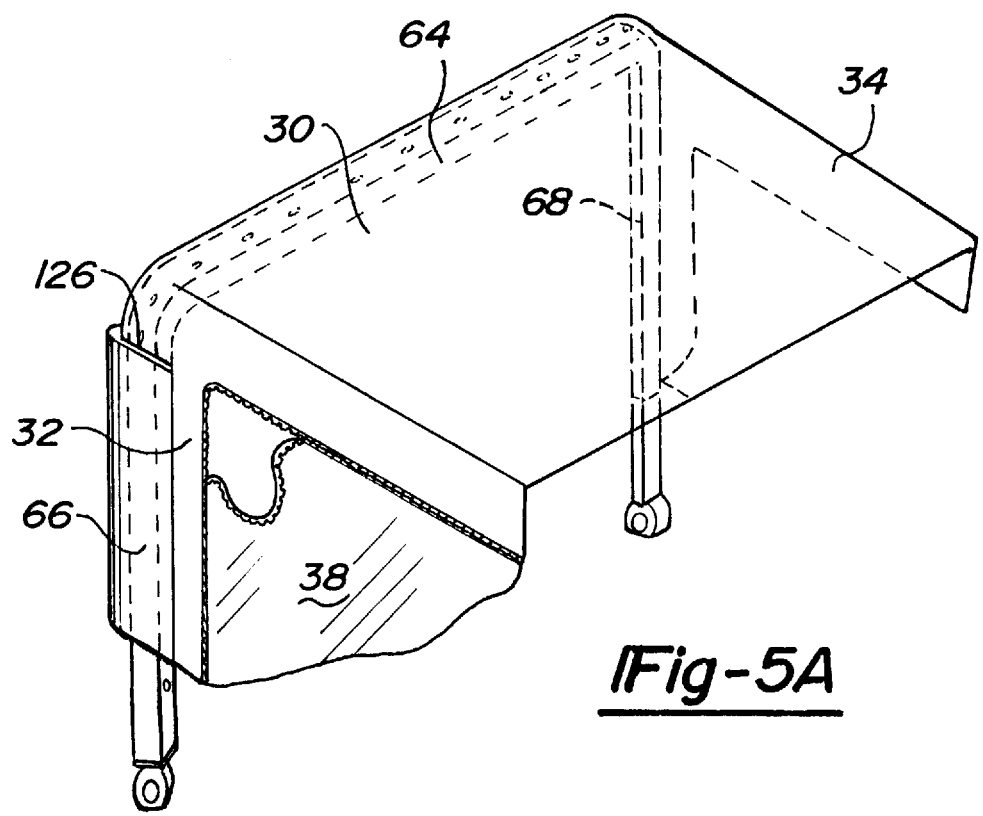
FIG. 5a is a partial view of the telescoping and extensible U-shaped assembly illustrated in FIG. 2 and further showing the respective connections of the soft cover to the tops and sides of the U-shaped assembly.
Figure 5:
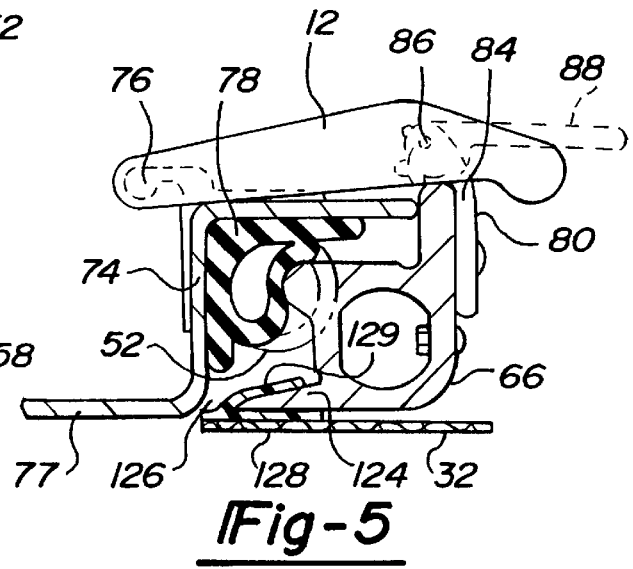
FIG. 5 is a cutaway view taken along line 5—5 of FIG. 1 and illustrating a downwardly looking view of a side of the U-shaped extensible assembly according to the first preferred embodiment.

Taking into consideration the cutaway view of FIG. 5, the connection between the U-shaped member 66 and the intermediate member 62 can be seen in a downwardly viewed fashion. The configuration of the upper extremity of the intermediate member 62 in cross section is somewhat more circular in fashion over the length of the slotted portion 70 to facilitate the extensible telescopic movement of the slidably connected U-shaped bar. As is further seen in FIG. 1, the lower region of the intermediate member 52 not telescopically recessed within the U-shaped bar member 66 is substantially more square shaped in section to match the square shaped contour of the U-shaped bar and to provide an overly more consistent appearance when in its fully retracted position.

Referring again to FIG. 5, an angled rear edge 74 of the front hard top 15 is provided for locating and supporting the members 64, 66 and 68 which make up the U-shaped bar and the telescopically connected intermediate members 52 and 62 when the U-shaped assembly 46 is in a fully upright and retracted position. Upon reference again to FIG. 2, an outline of the body portion 74 of the vehicle can be seen and extends in a substantially identical fashion to the U-shaped bar members 64, 66 and 68 and intermediate mounting members 52 and 62.

As is further seen upon referring once again to FIG. 5, the abutting body surface 74 is substantially L-shaped in cross section and further includes a recessed engaging portion 76 which is secured to the vehicle 12. An outer and perpendicularly extending portion 77 defines a side of the vehicle rear edge portion 74 as evident from FIG. 5. An elastomeric insert 78 or seal is positioned parallel to the intermediate member 52 and contacts the opposing and slidably connected portion of the extending U-shaped bar member 66 to provide a cushioning and sealing support for the telescoping and retracting of U-shaped assembly. Although not shown, an identical arrangement is provided for the connection between the second intermediate member 62 and the downwardly extending U-shaped bar member 68.

As is illustrated in FIG. 2, a locking assembly 80 is provided for securing in place the downwardly extending member 66 of the U-shaped bar and a locking means 82 for likewise securing the downwardly extending member 68. Referring again to FIG. 5, the locking assembly 80 is shown in more detail and includes an abutting member 84 which is rotatably attached about a pivot 86 recessed within the vehicle body 12 as illustrated in phantom and which is rotated from an engaging position as shown in FIG. 2 for providing locking support to the U-shaped bar to a disengaging position 88 for permitting the extensible assembly 46 to be telescoped toward the rear of the vehicle. A similar latch or locking assembly can be positioned at another point along the extensible assembly 46, such as the center of the central U-bar member 64.

It is further understood that the telescoping connection between the second intermediate member 62 and the opposing downwardly shaped member 68 of the integral U-shaped bar is identical in every respect to the disclosure of the first intermediate member 52 and downwardly extending member 66 illustrated in FIGS. 3–5, the latter being shown only in those views for convernence of illustration.

Referring once again to FIG. 2, a second substantially U-shaped member 90 is located towards the rearward end 22 of the vehicle 12. The second U-shaped member 90 includes a middle elongated portion 92, a first angularly extending opposing end 94 and a second angularly extending opposing end 96. The first opposing end 94 is pivotally connected to the roll bar 24 at an elevated and rearward position 98 and the second opposing end 96 is likewise connected to the roll bar 26 at an elevated and rearward position 100 so that the middle elongated portion 92 is pivotally associated at spaced distance above and to the rear of the roll bars.

Figure 8:
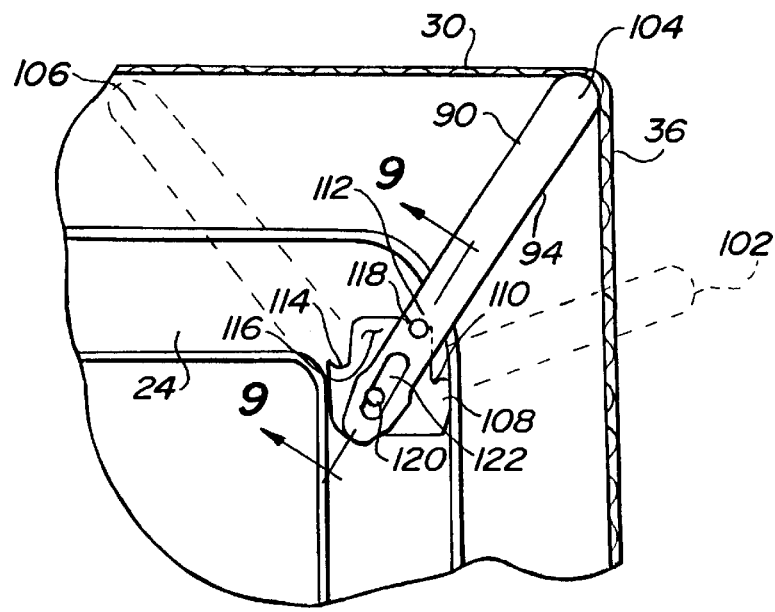
FIG. 8 is a side view in section of the second pivotally connected and U-shaped member for tautening the flexible cover according to the present invention.
Figure 9:
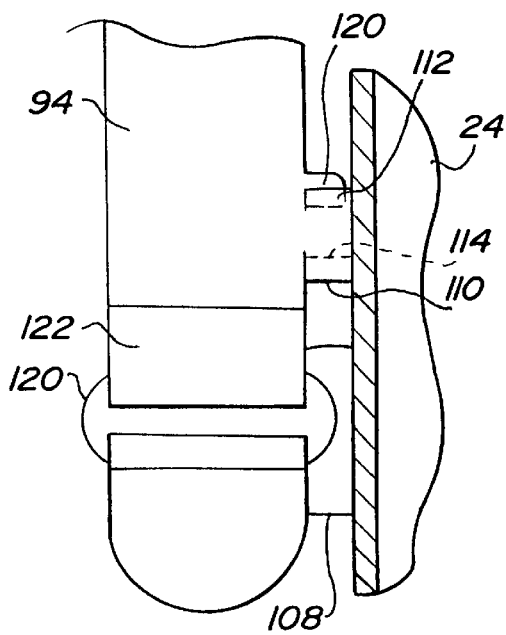
FIG. 9 is a cutaway view taken along 9—9 of FIG. 8 and illustrating one of the two pivot mechanisms for selectively pivoting the U-shaped member between the material installing, tautening and retracted non-use positions.

Referring to FIGS. 8 and 9 additional features of the second U-shaped member 90 are disclosed which enable the member 90 to be selectively and pivotally rotated to a given position to facilitate the installation and removal of the flexible cover 28 from the vehicle 12. Specifically, referring to FIG. 8, the U-shaped member 90 is illustrated in side profile with a first phantom view 102 demonstrating a material pre-installation position, a second solid view 104 illustrating a pivotally rotated and material tautening installed position and, finally, a third phantom position 106 illustrating a retracted and non-use position.

Referring still to FIG. 8, a side view of the opposing end 94 is shown in the pivotally rotated and solid outline 104 corresponding to the material tautening and installed position. Both the angularly extending and opposing ends 94 and 96 each incorporate a pivoting mechanism to permit the U-shaped member 90 to be pivotally realigned to the desired orientation as will now be described. As is best shown from FIG. 8, the U-shaped member 90 is pivotally attached to the first and second roll bars 24 and 26 by respective first and second mounting brackets. A mounting bracket 108 is shown in the side view of FIG. 8 mounted to the roll bar 24 and an identical mounting bracket is likewise mounted to the other roll bar 26 at an identical position although it is not shown. The mounting bracket 108 is a substantially planar shaped member which is secured either by fasteners or welding to the side of the roll bar 24 and includes a first seating recess 110, a second seating recess 112 and a third seating recess 114 arranged at different spaced horizontal and vertical locations along an upwardly facing surface 116 of the mounting bracket 108. The seating recesses 110, 112, 114 each define a semicircular receiving cavity within the planar shaped face of the mounting bracket 108.

An engaging portion 118 extends inwardly from the angularly extending end 94 of the U-shaped member 90 and is selectively seated within one of the seating recesses 110, 112 or 114 upon desired rotation of the U-shaped member 90. To enable the U-shaped member to pivot and to facilitate seating of the engaging portion 118 within one of the associated recesses 110, 112 and 114, a pin 120 projects from the laterally facing planar surface of the mounting bracket and is rotatably and slidably mounted through a slotted portion 122 formed an axial distance along the associated connecting portion of the angularly extending opposing end 94 of the U-shaped arm 90.

As is again evident from the side view of FIG. 8 and the cross sectional view in partial cutaway of FIG. 9, the end member 94 of the U-shaped arm 90 can be pivoted and axially translated both about and along the slotted portion 122 to selectively reposition the U-shaped arm 90 at one of the desired positions 102, 104 and 106. The combined forces generated by the weight of the U-shaped bar and the restraining forces of the attached soft cloth top and side 30 and 36 are generally sufficient to retain the U-shaped bar within its associated seating recess in the mounting brackets, however it is envisionable that an additional securing mechanism could also be employed to ensure that the U-arm 90 does not become inadvertently disengaged from it associated mounting bracket recesses.

Having described the working features of the first U-shaped extensible assembly 46 and the second U-shaped and pivotally rotatable member 90, an explanation will now be had of the manner in which the flexible covering member 28 is attached and disattached from the corresponding rearwardly situated storage area. Specifically, a first, a second and a third retaining means are disclosed for securing the flexible cover to the U-shaped extensible assembly 46, the sides 18 and 20 and the rear 22 of the vehicle 12.

Referring again to FIG. 5, the first retaining means is illustrated and includes a forwardly directed engaging portion 124 which extends from the U-shaped bar. Although not shown in its entirety, the engaging portion 124 extends lengthwise along substantially the length of the downwardly extending side members 66 and 68 of the U-shaped bar. First continuous clip portions 126 are provided and are secured to forward edges of the sides 32 and 34 along inner faces of the covering portions 32 and 34. As seen in FIG. 5, the continuous clip portion 126 is substantially Y-shaped in cross section, with a first continuous portion 128 secured to the inner front edge faces of the covering portions 30 and 32 by sewing, adhesives or the like and further including a displaced portion 129 extending in an outwardly angularly directed fashion. The sides of the covering members are pulled forward so that the Y-shaped clip portions may be secured to the forwardly directed engaging portions illustrated by the engaging portion 124 and clip 126 of FIG. 5, to secure both sides 32 and 34 of the covering member.

Figure 2A:
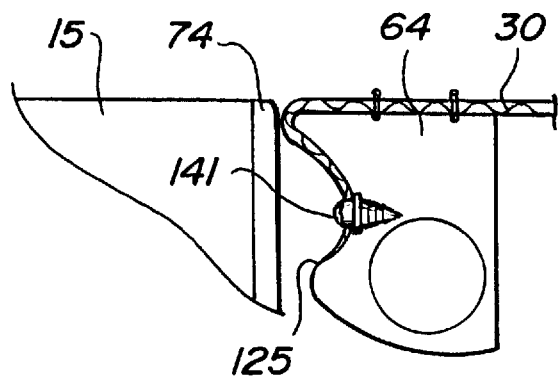
FIG. 2a is a cutaway taken along line 2a–2a of FIG. 1 and illustrating the connection of the soft cover to the central portion of the pivotal and extensible U-shaped assembly.

Referring to FIG. 2a, a cutaway view in cross section of the central elongated member 64 of the U-shaped bar is shown for permanently affixing a forward edge of the covering member top 30. Referring further to FIG. 5a, illustrated is a partial view in perspective of the interrelationship between the first retaining means for securing the sides 32 and 34 of the covering member to the downwardly extending arms 66 and 68 of the U-shaped bar in cooperation with the affixing of the top covering member 30 to the central elongated member 64.

Referring again to FIG. 2a, a contour of the central elongated member 64 is illustrated in cross section and includes a surface 125. A forward edge of the top covering member 30 is secured along an associated top edge of the central elongated member 64 by pluralities of spaced screws 129. The screws 129 secure the covering member 30 at spaced intervals across the entire distance of the central elongated member 64 and further extend a limited distance at each of the downwardly extending members 66 and 68.

As is shown in FIG. 5a, the Y-shaped clip portion 126 which makes up the first elongated and attachable member is illustrated in cooperation with the connection of the upper covering portion 30 to the central elongated member 64 to seal the forward edges of the top 30 and sides 32 and 34 of the covering member 28 to the U-shaped assembly 46. Only the Y-shaped clip portion which is associated with the side 32 of the cover for connection to the downwardly extending member 66 is seen clearly from FIG. 5a, however it is understood that the side 34 of the covering member is identically connected to the downwardly extending member 68.

The manner of connecting the top panel covering member to the U-shaped and extensible assembly permits it to be pivoted and extended across the tops of the roll bars 24 and 26 in a rearward direction towards the back of the vehicle 12 as illustrated in phantom at 46' as shown in FIG. 2 and without the cover shown. With the top covering member 30 secured to the central member 66 of the U-bar, the user may slidably translate the U-shaped bar of the assembly 46 up to its installed position by walking along the side of the vehicle and gripping one of the downwardly extending members 66 and 68. The Y-shaped clip portions 126 secured to the insides of the side covering members are then attached to their associated members 66 and 68 after the quarter windows are zipped into place in order to complete the first step of attaching the covering member.

Referring again to FIG. 2, the second retaining means is illustrated and, according to the preferred embodiment, includes a first elongated and attachable member 130 secured atop the side 18 and a second elongated and attachable member 132 secured atop the side 20 of the vehicle. The elongated and attachable members 130 and 132 extend lengthwise along their associated vehicle sides and each may further include a rounded end which terminates at the rear side 22 of the vehicle.

Figure 6:
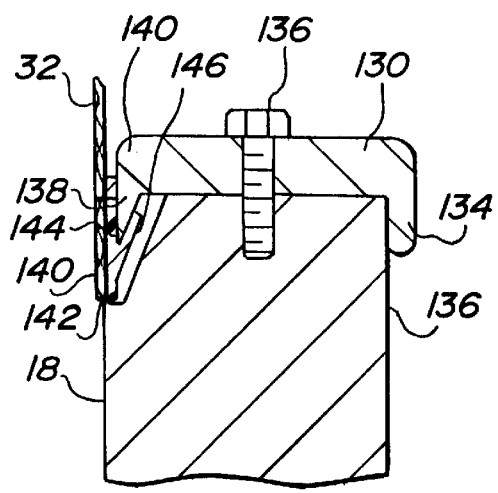
FIG. 6 is a cutaway view taken along line 6—6 of FIG. 3 and illustrating the elongated and attachable members for connecting the flexible cover to the sides of the vehicle.

Referring further to FIG. 6, a side view in cutaway is shown of the first elongated and attachable member 130 secured in place atop the vehicle side 18, the second elongated and attachable member 132 being arranged in an opposing and identical fashion. The elongated and attachable member 130 includes a downwardly directed inner lip 134 which abuts against a corresponding inner face 136 of the vehicle side 18 and assists in locating the elongated member 130 longitudinally along the surface of the vehicle. A plurality of bolts or other type fasteners 136 are provided at spaced intervals to secure the attachable members onto their associated sides. A curved member 131 communicates the first elongated member 130 to the rear of the vehicle and a curved member 133 likewise communicates the second elongated member 132 to the vehicle rear. The curved members 131 and 133 are provided as separated attachable portions and have an identical appearance in cross section as the elongated members 130 and 132.

Referring again to FIG. 6, a downwardly directed engaging portion 138 extends lengthwise along an outer edge 140 of the elongated and attachable member 130 and terminates in a substantially pointed edge similarly to the forwardly directed engaging portion 124 illustrated in FIG. 5. A corresponding bottom edge 140 of the covering side member 32 is illustrated and secured lengthwise along an inner face is a second and continuously extending clip portion 142. The second elongated clip portion 142 is likewise substantially Y-shaped in section with a first continuous portion 144 secured to the inner face of the covering member 32 and a second outwardly displaced portion 146.

The Y-shaped clip portion 142 engages the covering member upon the downwardly directed portion 138 in a second cover retaining step and the corresponding side 34 of the covering member is likewise secured to the second elongated and attachable member 132 (FIG. 2) in identical fashion to secure the bottom edges of the sides of the covering member once the forward edges of the top and sides have been secured to the U-shaped bar. It is also envisioned that the outwardly and downwardly extending edges along the sides of the Jeep vehicle may be contoured to receive the Y-shaped clip portions of the covering member without the necessity of the attachable members 130 and 132.

Figure 7:
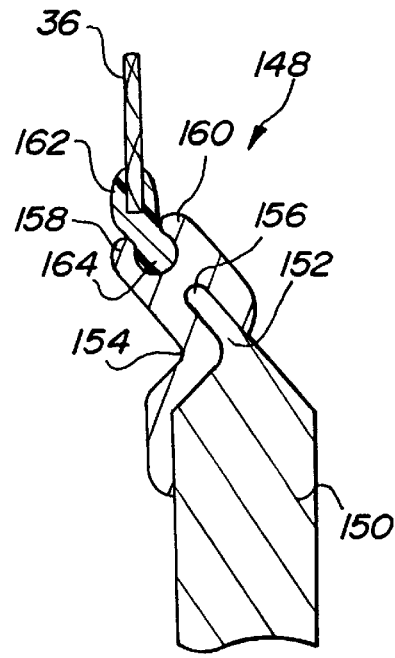
FIG. 7 is a cutaway view taken along line 7—7 of FIG. 1 and illustrating first and second interengaging members for securing the flexible cover to a rear tail gate of the vehicle.

Referring now to FIG. 7, a third retaining step 148 for securing the covering member to the assembly is illustrated.

A rear tail gate 150 of the Jeep vehicle is illustrated in cutaway and is also shown in the view of FIG. 2. A reduced dimensioned upper edge 152 of the tail gate 150 extends in a generally upwardly fashion and receives a first elongated and interengaging member 154 which extends lengthwise along the tail gate 150 and which includes a recessed portion 156 for receiving the reduced dimensioned edge 152 of the tail gate.

The first elongated and interengaging member 154 may be formed as a continuous extrusion of a aluminum material and terminates in an upper edge in a pair of spaced apart jaws 158 and 160. A second elongated and interengaging member 162 is attached lengthwise along a bottom edge of the rear covering member 36 and is preferably also an extruded member similarly to the first interengaging member 154 except that it is constructed of a nylon or similar plasticized material. The second interengaging member 162 includes a rounded edge 164 which may be press fit into the recess defined between the spaced apart jaws 158 and 160 of the first interengaging portion 154 to mount the rear side 36 of the flexible cover in a third cover retaining step.

Figure 10:
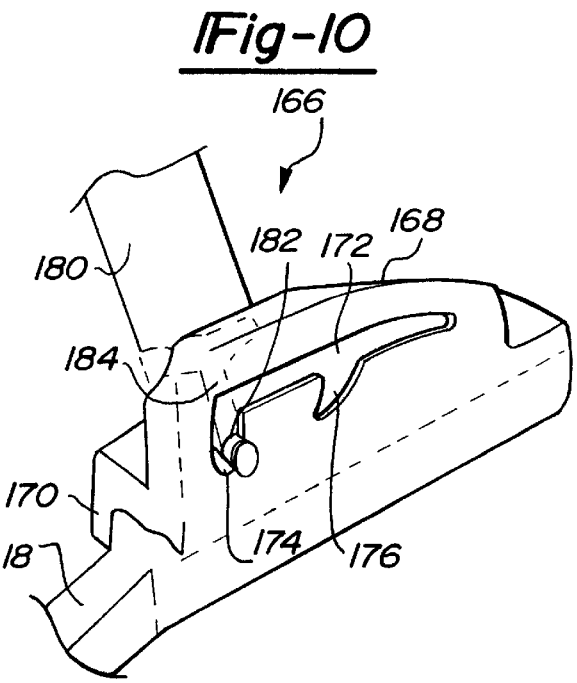
FIG. 10 is a sectional view in perspective of an extensible first U-shaped assembly according to a further preferred embodiment and illustrating a mountable and elongated support member for receiving an integral U-shaped bar within a horizontally extending slot for translating and rotating motion of the bar along the vehicle's roll bars.

Referring now to FIG. 10, an alternatively configured mounting means 166 is disclosed for use with the first U-shaped and extensible assembly. The mounting means 166 includes first and second elongated support members, a first support member 168 only being illustrated in FIG. 10 however it being envisioned that an identical and opposite support member is also provided. The support member 168 is secured atop the side 18 of the vehicle using mounting fasteners or any other conventional type fastening means.

An inwardly angled lip 170 may be provided to facilitate mounting of the support member 168 and a horizontally directed and elongated slotted portion 172 is formed along substantially the length of the support member 168. The slotted portion includes a first downwardly extending seating recess 174 positioned at substantially the forward edge of the slotted portion 172. A second angled and intermediate installation recess extends downwardly from along a midpoint of the slotted portion 172.

An integrally formed and U-shaped bar member is provided and includes a central member and first and second downwardly extending side members, a portion of first side member 180 being illustrated in FIG. 10. The entire outline of the U-shaped bar is not shown for convenience of illustration, however it is understood that it is shaped substantially identically to the U-shaped bar with sides 64, 66 and 66 according to the first preferred embodiment. A pin 182 extends laterally outwardly from a reduced dimensioned bottom portion 184 of the side member 180 and is received in the slotted portion 172.

The U-shaped bar according to this embodiment is connected by identical pin assemblies to the first and second elongated support members and may be pivotally and translatably moved along the length of the slotted portions so that the middle extending member slides lengthwise along the tops of the roll bars. The assembly may therefore be seated between the first 174 and second 176 positions to selectively install or remove the flexible covering member and or to retract the U-shaped assembly. The provision of the elongated support members with slotted portions makes possible the use of the integral U-shaped bar in place of the telescoping assembly described in the first preferred embodiment.

Referring finally to FIG. 11, a view 180 is shown of the first covering portion 15 of the removable vehicle top assembly mounted atop the forwardly situated seating area of the vehicle. As has been previously described, the vehicle top assembly according to the present invention discloses a novel and convenient way of providing a split-top covering mechanism for a vehicle. In the view of FIG. 11, the rear soft top has been removed and only the forwardly directed covering portion 15 is in place. A series of fasteners, illustrated in section as fasteners 182, are provided for securing the forward cover 15 to the vehicle along forward and side edges of the vehicle frame. It is also understood that the forward covering member 15 may be provided as either a hard top or a soft top construction with an underbody skeletal frame and may be used alone or in combination with the rearwardly attaching soft top.

Having described my invention additional embodiments will become apparent to those skilled in the art to which it pertains without deviating from the scope of the amended claims.

We claim:

1. A removable vehicle top assembly for use with a Jeep-type vehicle, the vehicle including a forwardly situated seating area and a rearwardly situated storage area defined by sides and a rear of the vehicle, a pair of spaced apart roll bars extending along the seating and storage area of the vehicle, said vehicle top assembly comprising:

a first covering portion overlaying the passenger seating area and attachable to the vehicle;

a first generally U-shaped and extensible assembly pivotally secured to the sides of the vehicle proximate to a forward end of the storage area and enveloping the spaced apart roll bars;

a second generally U-shaped member having first and second opposing ends which are pivotally secured to the roll bars so that a middle elongated portion of said U-shaped member is spaced from the roll bars and is rotatable about a pivot point defined by said pivotal connection;

a flexible cover having an area defined by a top and at least one side which overlays said second U-shaped member and is secured to said first U-shaped and extensible assembly and to at least a portion of the sides and rear of the vehicle; and means for manipulating said first extensible assembly and said second pivotal U-shaped member to selectively install and remove said flexible cover from the vehicle.

2. The vehicle top assembly according to claim 1, said U-shaped and extensible assembly further comprising:

a first bracket mounted to one of the sides of the vehicle and a second bracket mounted to the other of the sides;

a first intermediate member pivotally secured to said first bracket by a first pin and a second intermediate member pivotally secured to said second bracket by a second pin, said first and second intermediate members each further including an axially extending slotted portion; and a U-shaped bar having a central member and first and second downwardly extending members, a pin assembly projecting from each of said first and second downwardly extending members and being received within said slotted portions to telescopically mount said U-shaped bar to said first and second elongated mounting members;

said U-shaped bar being extensible relative said mounting members over a range equivalent to a length of said slotted portions.

3. The vehicle top assembly according to claim 2, further comprising a contoured surface of the vehicle extending in a generally identical fashion as said U-shaped bar for providing an abutting contact for said U-shaped bar and said intermediate members in an installed position.

4. The vehicle top assembly according to claim 3, further comprising a selectively engageably and disengageable locking means for securing said U-shaped bar to said vehicle surface.

5. The vehicle top assembly according to claim 2, further comprising a seal located along each of said intermediate members for providing cushioning and a seal between said U-shaped bar and the front removable top.

6. The vehicle top assembly according to claim 2, said flexible cover further comprising a first side, a second side and a rear side extending from said top.

7. The vehicle top assembly according to claim 3, further comprising a first, a second and a third retaining means for securing said flexible cover to said U-shaped extensible assembly and to the sides and rear of the vehicle.

8. The vehicle top assembly according to claim 7, said first retaining means further comprising a forwardly directed engaging portion extending along said first and second downwardly extending members of said U-shaped bar, a first continuous and substantially Y-shaped clip extending from along a forward edge of said first and second sides of said flexible cover and attaching said flexible cover upon said forwardly directed engaging portion.

9. The vehicle top assembly according to claim 7, said first retaining means further comprising a forward edge of said top of said flexible cover secured to said central member of said U-shaped bar by a plurality of spaced apart fasteners.

10. The vehicle top assembly according to claim 7, said second retaining means further comprising a first elongated and attachable member extending along one of the vehicle sides and a second elongated and attachable member extending along the other of the vehicle sides, each of said attachable members further including an outer and downwardly directed engaging portion, a second continuous and substantially Y-shaped clip extending from along a bottom edge of said first and second sides of said flexible cover and attaching said flexible cover upon said downwardly directed engaging portion.

11. The vehicle top assembly according to claim 7, the vehicle further including a rear tail gate, said third retaining means further comprising:

a first elongated interengaging member extending lengthwise from an upper edge of the tail gate, said first member including a pair of spaced apart jaws which define therebetween a recessed slot; and a second elongated interengaging member extending lengthwise from a bottom edge of said rear side of said flexible cover, said second member including a projecting portion which is received between said spaced apart jaws to secure said flexible cover to the tail gate.

12. The vehicle top assembly as described in claim 1, further comprising means for pivotally moving said second generally U-shaped member between a material installing position, a material tautening position and a retracted non-use position.

13. The vehicle top assembly as described in claim 12, said means for pivotally moving further comprising a pivot mechanism incorporated into each of said first and second opposing ends of said second U-shaped member.

14. The vehicle top assembly as described in claim 13, said pivot mechanism further comprising:

a first mounting bracket secured to a first of the roll bars and a second mounting bracket secured to a second of the roll bars, each of said mounting brackets being shaped as a planar faced member having an upwardly facing surface with a plurality of seating recesses formed in said upwardly facing surface at desired vertical and horizontal locations, an anchoring pin portion extending laterally outwardly from said planar face of each of said mounting brackets;

a slotted portion extending axially along a base of each of said first and second opposing ends and formed through said opposing ends so that said first and second ends are mounted upon said laterally outwardly extending pins and said pins extend through said slotted portions to pivotally and slidably mount said second generally U-shaped member to the roll bars; and an engaging portion extending inwardly from each of said first and second opposing ends of said second U-shaped member, said U-shaped member being axially slided and pivoted about said mounting brackets to selectively seat said engaging portions within a selected pair of associated recesses in said mounting brackets.

15. The vehicle top assembly as described in claim 1, said first generally U-shaped and extensible assembly further comprising:

a first elongated support mounted to one side of the vehicle and a second elongated support secured to the other side of the vehicle, a horizontally directed slotted portion being formed in each of said elongated supports, each of said slotted portions further including a first seating recess, a second angled and intermediate installation recess; and an integrally formed U-shaped bar including first and second sides and a middle, a pin extending from each of said first and second sides to mount said U-shaped bar within said associated support slotted portions;

said U-shaped bar translating along said slotted portions and being selectively seated within one of said first and second recesses to position said extensible assembly.

16. The vehicle top assembly as described in claim 1, further comprising a plurality of fasteners for securing said first covering portion atop the passenger compartment of the vehicle.

17. The vehicle top assembly as described in claim 6, further comprising at least one window zippered window in said first side, second side and rear side of said flexible cover, said at least one zippered window being removable from said cover when said cover is in an installed position and without affecting the integrity of the installed cover.

* * * * *